W. WELLS.
Corn Sheller.
No. 22,523.
Patented Jan'y 4, 1859.
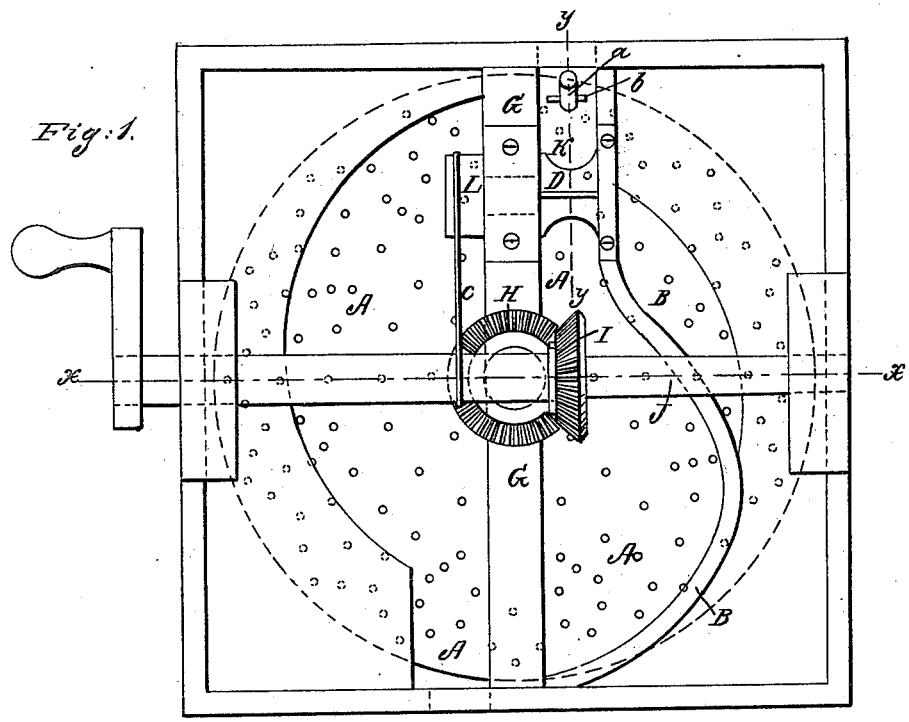
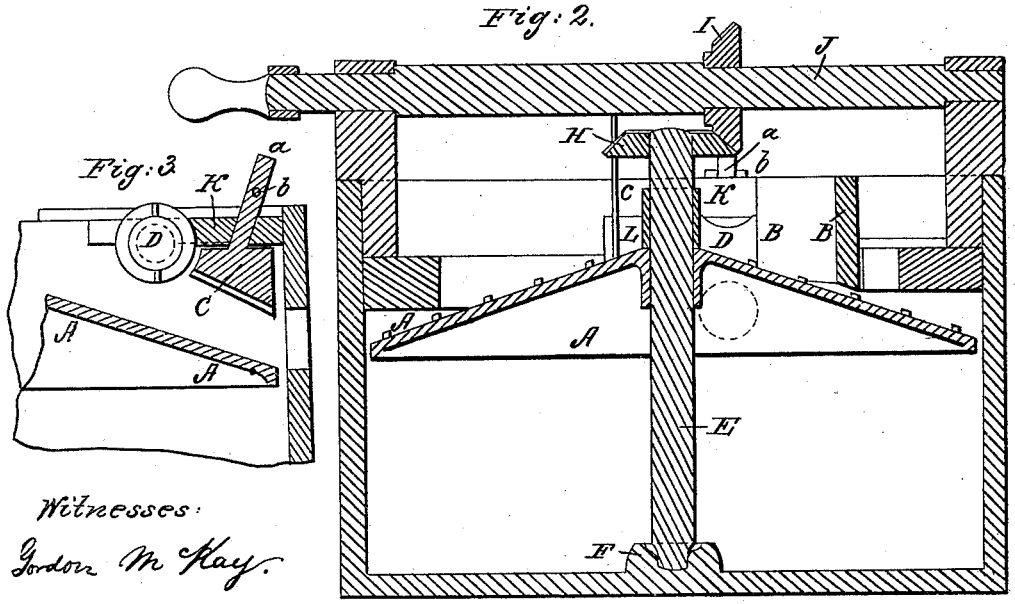
Witnesses:
Gordon McKay.
J. B. Crosby.
Inventor:
William Wells.

UNITED STATES PATENT OFFICE.

WILLIAM WELLS, OF BOSTON, MASSACHUSETTS.

CORN-SHELLER.

Specification of Letters Patent No. 22,523, dated January 4, 1859.

*To all whom it may concern:*

Be it known that I, WILLIAM WELLS, of the city of Boston, in the county of Suffolk and State of Massachusetts, have invented certain new and useful Improvements in Corn-Shelling Machines; and I do hereby declare that the following is a clear, full, and exact description of the same, sufficient to enable those skilled in the art to practice my invention, reference being had to the accompanying drawings and to the letters of reference marked thereon.

Figure 1, is a plan of a machine embodying my invention. Fig. 2, is a vertical cross section of the same in the line *x*, *x*, seen in Fig. 1. Fig. 3 is a section through the presser (C) and beater (D) in the line *y*, *y*, seen in Fig. 1.

Similar letters refer to similar parts in all the figures of the drawings.

The nature of my invention consists in the form which I give to the acting face of the shelling wheel, and in its position, in combination with the direction or position of the guide (B), and also in the use of the yielding presser (C) in combination with the beater (D).

It will be observed, from inspection of the drawings, that the shelling wheel (A) is a flat cone, having its axis vertical. It is purposely so made in order that the ears of corn to be acted upon will have a tendency to roll toward the circumference of the circle in addition to the centrifugal tendency which they receive from the rotation of said wheel, and it should be made sufficiently conical to effect this purpose. This wheel is thickly studded with teeth or projections upon its upper or acting surface. It may also be made open or have holes cut through it, through which a portion of the corn falls, after it is separated from the cob, into any convenient receptacle beneath, the balance escaping over the circumference of the wheel into the receptacle. The guide (B), as shown in the drawings, starts from the frame of the machine, to which it is fixed, and crosses the face of the wheel in such a manner that a portion of the guide approaches the center of the wheel before reaching the outlet at which the cobs are discharged.

The guide is fixed to the frame by both its ends, above the wheel (A) so as to clear the teeth thereon and leave space sufficient for the escape of the shelled corn while it retains the unshelled ears. It may be here observed that there may be more than one of these guides, and consequently more than one place for feeding in the unshelled ears, and for discharging the cobs, the number depending upon the diameter of the shelling wheel and the power employed to rotate it. The drawings represent a machine designed for two shelling divisions above the wheel; for convenience in representing the construction of the machine the parts appropriate to one of the divisions are omitted in the drawings showing the shelling wheel beneath; the parts omitted are duplicates of those represented.

The arrangement of the guide (B), whether it occupies the whole, one half, or any other portion of the shelling wheel, is important in effecting the separation of the corn from the cob, because when the ears fall upon the shelling wheel they are impelled to gravitate toward the circumference of the wheel, toward which they are also driven by centrifugal force derived from rotation of the wheel. The ears are prevented from leaving the wheel by the guide, against which the forces described keep them in close contact. The teeth on the wheel catching in or on the ears would carry them around in the circles which they describe, but as these are intersected by the form of the guide (B), the ears are driven along its shape by a compound of three forces, one of which would throw them from the wheel in lines tangential to its circumference, another would roll them off the wheel in its radial lines, and the third would carry them with the wheel in its own circles of rotation. The ears are thus impelled to the edge of the wheel, then up its incline toward its center, and from thence toward its edge again, where the cobs are discharged.

The teeth of the wheel passing under the ears rotate them around their own axes and strip them of the corn as they move along the guide, while the corn falls into the receptacle beneath the wheel.

The shape and construction of the frame are matters of slight importance, and may be very much varied. The frame should however afford facilities to attach the shaft bearings thereto and should be arranged to prevent the corn from scattering, as it is shelled, and to direct it into some convenient receptacle. The wheel (A) is best made of cast iron, with teeth or projections formed upon it; it is keyed fast upon a wrought iron shaft (E), which runs in a step (F) beneath the wheel. The shaft extends through and above the wheel and is supported in a bearing in the dividing piece (G). The bevel wheel (H), on the end of shaft (E), meshes into bevel wheel (I) on the horizontal shaft (J); this shaft runs in bearings fixed to the frame, and to it may be applied power in any convenient manner to operate the machine.

Provision is made for shelling the few grains of corn which may adhere to the cob before it is ejected from the machine, by arranging a yielding presser over the wheel just in front of the outlet. The arrangement shown in the drawings for this purpose consists of the piece (C) which may be made heavy enough to press the ears upon the wheel with sufficient force, or it may be made to press upon them by the action of a spring. The acting face of (C) is inclined somewhat to that of the wheel, so that the space between them is wedge shaped, which facilitates the entrance therein of the partially shelled ears; (C) is kept in place and is guided by the spindle (a) which plays in a hole in the piece (K), which keeps the presser (C) from being thrown out of its place as the cobs pass under it. A pin (b) through the spindle keeps the presser from falling upon the wheel and breaking the teeth.

To prevent the cobs or partially shelled ears from jamming in the passage under the presser, the clearer (D) is arranged to revolve at a height above the face of the wheel sufficient to allow but one ear to pass beneath it, and directly in front of the presser. A pulley (L) is fixed on the shaft of the clearer, which is rotated by a band (c) passing around the pulley and the shaft (J).

The space above the wheel should not be subdivided into so many shelling divisions as to render the distance to be traversed by the ears along the guide too short in which to effect the separation of most of the corn from the cob, as this would require too great an amount of the shelling to be done under the presser, which is intended only as auxiliary in the shelling process. Care should be taken to give the guide such a form, near the outlet for the cobs, as will best facilitate their discharge and prevent their clogging. The form shown in the drawings is well adapted to that end. When but one shelling division is made above the whole surface of the wheel, the dividing piece (G) should be cut away above the wheel on that side of the shaft (E) farthest from the cob outlet, sufficiently to allow the largest ears to pass beneath it on that side and the curve of the guide should be so modified as to extend nearly around the wheel.

I claim—

The arrangement and combination of the shelling wheel A, guide B, clearer D, and weighted or spring presser C, constructed and operating in the manner described for the purpose specified.

WILLIAM WELLS.

Witnesses:
J. B. CROSBY,
GORDON MCKAY.